United States Patent
Spenninger et al.

(10) Patent No.: US 12,233,535 B2
(45) Date of Patent: Feb. 25, 2025

(54) SYSTEM FOR PERFORMING AN INPUT ON A ROBOTIC MANIPULATOR

(71) Applicant: FRANKA EMIKA GMBH, Munich (DE)

(72) Inventors: Andreas Spenninger, Karlsfeld (DE); Saskia Golz, Munich (DE); Sven Parusel, Munich (DE)

(73) Assignee: Franka Emika GmbH, Munich (DE)

( * ) Notice: Subject to any disclaimer, the term of this patent is extended or adjusted under 35 U.S.C. 154(b) by 229 days.

(21) Appl. No.: 17/620,236

(22) PCT Filed: Jun. 26, 2020

(86) PCT No.: PCT/EP2020/067981
§ 371 (c)(1),
(2) Date: Dec. 17, 2021

(87) PCT Pub. No.: WO2020/260555
PCT Pub. Date: Dec. 30, 2020

(65) Prior Publication Data
US 2022/0362943 A1  Nov. 17, 2022

(30) Foreign Application Priority Data
Jun. 26, 2019  (DE) .................... 10 2019 004 478.9

(51) Int. Cl.
*B25J 13/08* (2006.01)
*B25J 9/16* (2006.01)
*B25J 13/06* (2006.01)

(52) U.S. Cl.
CPC ........... *B25J 13/085* (2013.01); *B25J 9/1671* (2013.01); *B25J 13/06* (2013.01)

(58) Field of Classification Search
CPC ........ B25J 13/085; B25J 13/088; B25J 13/08; B25J 9/1671; B25J 13/06; B25J 9/16;
(Continued)

(56) References Cited

U.S. PATENT DOCUMENTS 5,880,956 A    3/1999  Graf
2013/0345870 A1   12/2013  Buehler et al.
(Continued)

FOREIGN PATENT DOCUMENTS

DE   102008062622 A1   6/2010
DE   102017202439 A1   8/2018
(Continued)

OTHER PUBLICATIONS

English translation of International Preliminary Report on Patentability issued in International Application No. PCT/EP2020/067981 on Jan. 6, 2022.
(Continued)

*Primary Examiner* — Jason Holloway
*Assistant Examiner* — Benjamin J Brosh
(74) *Attorney, Agent, or Firm* — Hoffmann & Baron, LLP

(57) ABSTRACT

A system for performing an input on a robotic manipulator, wherein the system includes: a robotic manipulator having a plurality of links connected to one another by articulations and having actuators; a sensor unit configured to record an input variable, applied by a user by manually guiding the robotic manipulator, on the robotic manipulator, wherein the input variable is a kinematic variable or a force and/or a moment, and wherein the sensor unit is configured to transmit the input variable; and a computing unit connected to the robotic manipulator and to the sensor unit, the computing unit configured to transform the input variable received from the sensor unit via a predefined input variable mapping, wherein the input variable mapping defines a mathematical mapping of the input variable onto a coordinate of a graphical user interface or onto a setting of a virtual control element.

18 Claims, 1 Drawing Sheet

(58) Field of Classification Search
CPC ... B25J 9/10; B25J 9/1694; G01L 5/22; G01L 5/226; G01L 5/228; G05B 2219/36401; G05B 19/423; G06F 3/0487; G06F 3/048; G06F 9/451
See application file for complete search history.

(56) References Cited

U.S. PATENT DOCUMENTS

| | | |
|---|---|---|
| 2014/0114464 A1 | 4/2014 | Williams et al. |
| 2018/0200880 A1 | 7/2018 | Meissner et al. |
| 2018/0361594 A1 * | 12/2018 | Haddadin .............. B25J 9/1656 |

FOREIGN PATENT DOCUMENTS

| | | |
|---|---|---|
| DE | 102018200864 B3 | 2/2019 |
| DE | 102017010678 A1 | 5/2019 |
| JP | 2016-175178 A | 10/2016 |
| WO | WO-2016162066 A1 * | 10/2016 |

OTHER PUBLICATIONS

Notice of Reasons for Rejection and English-language translation issued in Japanese Application No. JP 2024-010612 on Dec. 3, 2024.

* cited by examiner

SYSTEM FOR PERFORMING AN INPUT ON A ROBOTIC MANIPULATOR

CROSS-REFERENCE TO RELATED APPLICATIONS

The present application is the U.S. National Phase of PCT/EP2020/067981, filed on 26 Jun. 2020, which claims priority to German Patent Application No. 10 2019 004 478.9, filed on 26 Jun. 2019, the entire contents of which are incorporated herein by reference.

FIELD

The invention relates to a system for performing an input on a robotic manipulator and to a method for performing an input on a robotic manipulator.

SUMMARY

The aim of the invention is to improve the performance of an input on a robotic manipulator by a user.

The invention results from the features of the independent claims. Advantageous developments and embodiments are the subject matter of the dependent claims.

A first aspect of the invention relates to a system to perform an input on a robotic manipulator, the system including:

- a robotic manipulator having a plurality of links connected to one another by articulations and having actuators;
- a sensor configured to record an input variable, applied by a user by manually guiding the robotic manipulator, on the robotic manipulator, wherein the input variable is a kinematic variable or a force and/or a moment, and wherein the sensor is configured to transmit the input variable; and
- a computing unit connected to the robotic manipulator and to the sensor unit, the computing unit is configured to transform the input variable received from the sensor unit via a predefined input variable mapping, wherein the predefined input variable mapping defines a mathematical mapping of the input variable onto a coordinate of a graphical user interface or onto a setting of a virtual control element.

The coordinate of a graphical user interface corresponds, in particular in the case of a screen, to a coordinate on the screen, and in the case in which the graphical user interface is represented on virtual reality goggles, to a coordinate on the virtual reality goggles.

According to the first aspect of the invention and also below, an end effector can also be understood to be a "link" of the robotic manipulator, wherein the end effector is typically arranged on the distal link of the robotic manipulator.

The input variable is to that extent preferably a kinematic variable, that is to say a position and/or an orientation of at least one link or of a predefined point on the robotic manipulator, or a time derivative thereof, that is to say a speed or an acceleration, or alternatively preferably a force applied onto the robotic manipulator by the user or a moment applied onto the robotic manipulator by the user, wherein in the last case of a moment or of a force, the computing unit is preferably configured to actuate the actuators of the robotic manipulator in such a manner that the robotic manipulator behaves as a rigid body, that is to say, to the extent made possible by the actuators, the actuators generate a counter-moment against an attempted movement of the robotic manipulator by the user. Accordingly, the sensor unit includes at least sensors which are suitable to determine a position and/or an orientation of a link or of a point on the robotic manipulator or multiple links, and optionally also force sensors and/or moment sensors.

If the graphical user interface is represented on a screen, then in particular, the input variable mapping is a projection of the input variable onto the two-dimensional plane of the screen, in particular, taking into consideration the geometric limits of the screen, wherein, advantageously, the robotic manipulator (and in particular, its actuators), in the case of such an input variable which correlates with the reaching of one of the limits of the screen, is actuated by the computing unit in such a manner that the actuators provide an artificial resistance against an additional movement of the robotic manipulator.

The virtual control element is preferably an emulation of a real physical control element, for example, a rotary controller or a sliding controller. The virtual control element has, in particular, a lower limit and an upper limit, and between these two limits, a setting is defined which can be used, in particular, as parameter for the robotic manipulator.

It is an advantageous effect of the invention that a user of the robotic manipulator can intuitively perform an input on the robotic manipulator by a corresponding movement of the robotic manipulator by a corresponding application of a force or of a moment onto the robotic manipulator. The input of the user on the robotic manipulator can, to that extent, include a numerical value or else a command on the robotic manipulator, in particular, relating to a graphical user interface, so that the input of the user can advantageously be used for menu control either by mouse pointer (controlled by the input variable) or simply by switching through marked menu entries or objects on the graphical user interface. Advantageously, the user can therefore use the robotic manipulator universally as input device, since, as a result of the predefined input variable mapping, a corresponding reference to the graphical user interface or to the virtual control element is established. In particular, advantageously, the recording of a force or a moment or else a position change, in each case caused by the manual guiding on the part of the user on the robotic manipulator, can be defined as a haptic gesture by which, in particular, menus or functional regions of the graphical user interface can be controlled.

Moreover, advantageously, the system according to the first aspect of the invention can also be used for a system with a first robotic manipulator and a second robotic manipulator, wherein, in particular, the first robotic manipulator is used for performing the input according to the first aspect of the invention, and, in particular, the second robotic manipulator is designed for performing the first aspect of the invention in an alternative.

According to an advantageous embodiment, the computing unit for performing a predefined operation of the robotic manipulator is carried out depending on the transformed input variable or the coordinate or the setting.

The predefined operation of the robotic manipulator is here, in particular, the activation of an object on a graphical surface, preferably connected with the subsequent action of the robotic manipulator, for example, the parametrization of a function or of a robot program, as well as possibly the start of the execution of such a program or of such a function, moreover possibly the switching off of the robot manipulator, the storing of a current position value or of a value of the current orientation of the robotic manipulator.

According to an additional advantageous embodiment, the system includes a display unit, wherein the display unit is configured to display at least one of the following:
  input variable,
  amount of the input variable,
  a transformed input variable.
  amount of the transformed input variable.

The display unit is preferably one of: screen, projector, virtual reality display goggles, or LED unit. Advantageously, thereby, instant feedback is given to the user as to which type of input and/or at which level he/she is performing the input at a given time. In particular, the display unit is designed for displaying a mouse pointer with the current coordinate as mouse pointer coordinate and/or for displaying the current setting of the virtual control element.

According to an additional advantageous embodiment, the sensor unit is configured to record a current position and/or a current orientation of the robotic manipulator and configured to transmit the current position and/or the current orientation to the computing unit, wherein the computing unit is configured to actuate the actuators in such a manner that, during a manual guiding onto a predefined geometric structure, the robotic manipulator generates a resistance against movement of the robotic manipulator caused by the manual guiding, and wherein the computing unit is configured to activate a predefined function if the resistance exceeds a predefined limit value or if a distance of a predefined point of the robotic manipulator with respect to the predefined geometric structure undershoots a predefined limit value. Advantageously, this embodiment results in dispensing with an input element on the robotic manipulator, so that purely by the gesture control of the user, for example, the function of a mouse click can be generated, or else other functions on the graphical user interface can be activated.

According to an additional advantageous embodiment, the predefined function is activation of an object on the graphical user interface, at least if the coordinate coincides a predetermined coordinate range of the object. According to this embodiment, at the current position, in particular, at the current position of an end effector of the robotic manipulator, the function is activated similarly to a mouse click, wherein the current input variable and/or the past course of the input variables determine(s) the current coordinate of the graphical user interface, so that, in a manner similar to the guiding of a mouse pointer onto an object of the graphical user interface and in the case of subsequent clicking or double clicking with the mouse, the respective object located under the mouse pointer can be activated.

According to an additional advantageous embodiment, the predefined geometric structure is a plane and the plane is invariant in terms of its orientation and position with respect to a terrestrial coordinate system.

According to an additional advantageous embodiment, the computing unit is configured to actuate the actuators in such a manner that, during manual guiding of the robotic manipulator, the robotic manipulator outputs a haptic feedback and/or a tactile feedback of the input variable as recorded and/or of the input variable as transformed.

According to an additional advantageous embodiment, the haptic feedback and/or the tactile feedback in each case includes at least one of the following:
  a position-dependent grid, dependent in particular on the position of an end effector,
  a resistance-caused delimitation of a work region in which the robotic manipulator is capable of being manually guided, that is to say an artificial wall generated by counter-force,
  a feedback in case the input variable and/or a current position and/or a current orientation of the robotic manipulator and/or the transformed input variable coincides with an object on the graphical user interface, wherein the coordinate of the graphical user interface is assigned to the input variable and/or to a current position and/or current orientation and/or to the transformed input variable of the robotic manipulator, and
  a signal if the coordinate coincides a predefined coordinate range of the object of the graphical user interface.

According to an additional advantageous embodiment of the system, the display unit is a screen.

According to an additional advantageous embodiment, the computing unit is configured to actuate the robotic manipulator with gravity compensation. In the case of actuation of the robotic manipulator with gravity compensation, the actuators are actuated so that gravity acting on the robotic manipulator is compensated, so that, in the absence of an external force effect and proceeding from a static rest position without acceleration, the robotic manipulator continues to be in this rest position and remains in it. This advantageously facilitates the manual guiding of the robotic manipulator for the user.

An additional aspect of the invention relates to a method of performing an input on a robotic manipulator having a plurality of links connected to one another by articulations and having actuators, wherein the method includes:
  recording using a sensor unit an input variable applied by a user by manually guiding the robotic manipulator, on the robotic manipulator, wherein the input variable is a kinematic variable or a force and/or a moment,
  transmitting the input variable using the sensor unit, and
  transforming using the computing unit the input variable received from the sensor unit via a predefined input variable mapping, wherein the predefined input variable mapping defines a mathematical mapping of the input variable onto a coordinate of a graphical user interface or onto a setting of a virtual control element of the computing unit.

According to an advantageous embodiment, the method moreover includes:
  displaying by the display unit a mouse pointer with a current mouse pointer coordinate and/or a current setting of the virtual control element.

According to an advantageous embodiment, the method moreover includes:
  performing a predefined operation of the robotic manipulator depending on the transformed input variable or the coordinate or the setting.

Advantages and preferred developments of the proposed method result from an analogous and appropriate application of the explanations provided above in connection with the proposed system.

Additional advantages, features and details result from the following description in which—optionally in reference to the drawings—at least one embodiment example is described in detail. Identical, similar and/or functionally equivalent parts are provided with identical reference numerals.

The representations in the figures are diagrammatic and not true to scale.

DETAILED DESCRIPTION

Figure 1:
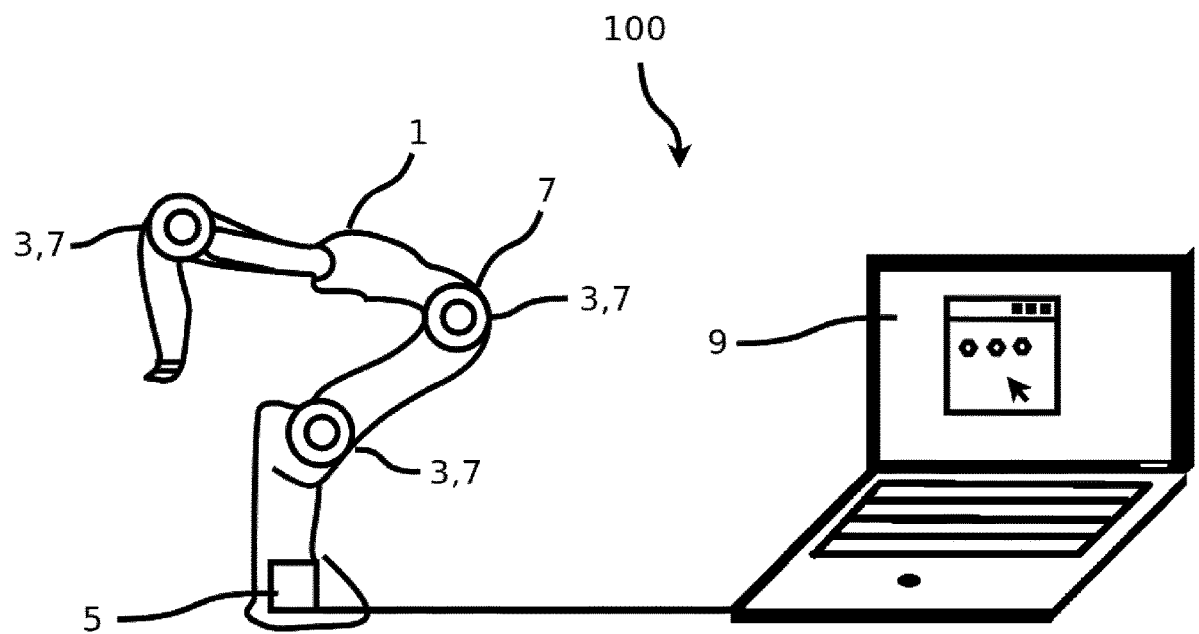
FIG. 1 shows a system for performing an input on a robotic manipulator according to an embodiment example of the invention.

FIG. 1 shows a system 100 for performing an input on a robotic manipulator 1, wherein the system includes:
- a robotic manipulator 1 having a plurality of links including an end effector connected to one another by articulations and having actuators 3;
- a computing unit 5 arranged on the base of the robotic manipulator 1; and
- a sensor unit 7 connected to the computing unit 5.

The sensor unit 7 is used for recording an input variable applied by the user by manually guiding the robotic manipulator 1, on the robotic manipulator 1, wherein the input variable is a force applied on the robotic manipulator 1 by the user, and wherein the sensor unit 7 is designed for transmitting the input variable to the computing unit 5. The computing unit 5 is here used for transforming the input variable via a predefined input variable mapping, and the input variable mapping is a mathematical mapping of the input variable onto a coordinate of a graphical user interface or onto a setting of a virtual control element. The system 100 furthermore includes a display unit 9, wherein the display unit 9 is designed to display at least one of the following:
- input variable,
- amount of the input variable,
- transformed input variable, and
- amount of the transformed input variable.

In particular, the display unit is designed for displaying a mouse pointer with the current mouse pointer coordinate. The sensor unit 7 is therefore used for recording a current position and/or a current orientation of the robotic manipulator 1 and for transmitting the current position and/or the current orientation to the computing unit 5, wherein the computing unit 5 is designed for actuating the actuators 3 in such a manner that the robotic manipulator 1, during manual guiding onto a predefined spatially fixed defined plane, generates a resistance against movement of the robotic manipulator 1 caused by manual guiding. The computing unit 5 is furthermore used for activating a predefined function if a predefined limit value in the resistance is exceeded or if a predefined limit value in the distance of a predefined point of the robotic manipulator 1 with respect to the geometric structure is undershot. The predefined function is an activation of an object on the graphical user interface, at least if the coordinate coincides a predefined coordinate range of the object. The computing unit 5 is moreover designed for actuating the actuators 3 in such a manner that, during manual guiding of the robotic manipulator 1, the robotic manipulator 1 outputs haptic feedback and/or tactile feedback of the recorded input variable and/or the transformed input variable, wherein the haptic feedback and/or the tactile feedback in each case include(s) at least one of the following:
- position-dependent grid, dependent in particular on the position of an end effector,
- resistance-caused limitation of the work region in which the robotic manipulator 1 can be manually guided,
- feedback in the case of coinciding of an input variable and/or a current position and/or current orientation of the robotic manipulator 1 with an object on the graphical user interface, wherein the coordinate of the graphical user interface is assigned to an input variable and/or a current position and/or current orientation of the robotic manipulator 1, and
- signal if the coordinate coincides a predefined coordinate range of the object of the graphical user interface. The display unit 9 here is a screen.

Figure 2:
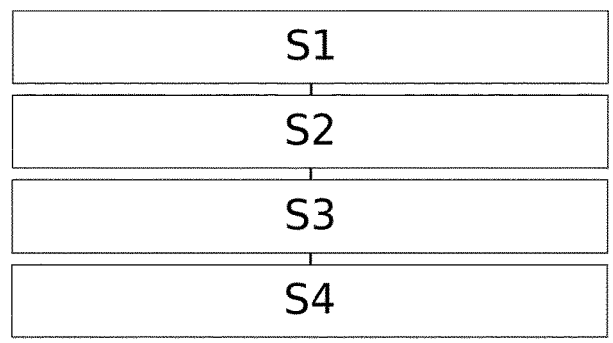
FIG. 2 shows a method for performing an input on a robotic manipulator according to an additional embodiment example of the invention.

FIG. 2 shows a method of performing an input on a robotic manipulator 1 having a plurality of links connected by articulations to one another and having actuators 3, wherein the robotic manipulator 1 is connected to a computing unit 5. The method includes:
- recording S1 an input variable applied by the user by manually guiding the robotic manipulator 1, on the robotic manipulator 1, by a sensor unit 7 connected to the computing unit 5, wherein the input variable is a kinematic variable or a force and/or a moment,
- transmitting S2 the input variable to the computing unit 5 by the sensor unit 7,
- transforming S3 the input variable via a predefined input variable mapping by the computing unit 5, wherein the predefined input variable mapping defines a mathematical mapping of the input variable onto a coordinate of a graphical user interface or onto a setting of a virtual control element of the computing unit 5, and
- displaying S4 a mouse pointer with the current mouse pointer coordinate and/or displaying the current setting of the virtual control element by the display unit.

Although the invention was illustrated and explained in greater detail by a preferred embodiment example, the invention is nevertheless not limited by the disclosed examples, and other variations can be derived therefrom by the person skilled in the art, without exceeding the scope of protection of the invention. Therefore, it is clear that multiple variation possibilities exist. It is also clear that embodiments mentioned as examples in fact represent only examples which in no way should be interpreted as limiting, for example, the scope of protection, the application possibilities or the configuration of the invention. Instead, the above description and the description of the figures enable the person skilled in the art to concretely implement the exemplary embodiments, wherein the person skilled in the art cognizant of the disclosed inventive idea can make diverse changes, for example, with regard to the function or the arrangement, in an exemplary embodiment of mentioned elements, without exceeding the scope of protection which is defined by the claims and their legal equivalents, such as, for example, further explanations in the description.

LIST OF REFERENCE NUMERALS

1 Robotic manipulator
3 Actuators
5 Computing unit
7 Sensor unit
9 Display unit
100 System
S1 Recording
S2 Transmitting
S3 Transforming
S4 Displaying

The invention claimed is:

1. A system to perform an input on a robotic manipulator, the system comprising:
- a robotic manipulator having a plurality of links including an end effector connected to one another by articulations and having actuators;

a sensor unit configured to record an input variable, applied by a user by user's manual guiding of the robotic manipulator, on the robotic manipulator, wherein the input variable is a kinematic variable or a force and/or a moment, and wherein the sensor unit is configured to transmit the input variable; and a computing unit connected to the robotic manipulator and to the sensor unit, the computing unit configured to:
    transform the input variable received from the sensor unit via a predefined input variable mapping, wherein the predefined input variable mapping defines a mathematical mapping of the input variable onto a setting of a virtual control element; and
    actuate the actuators in such a manner that, during the manual guiding of the robotic manipulator, the robotic manipulator outputs a haptic feedback and/or a tactile feedback associated with a resistance-caused boundary, such that the robotic manipulator behaves as a rigid body to an extent made possible by the actuators against an attempted movement of the robotic manipulator.

2. The system according to claim 1, wherein the system comprises a display unit, the display unit configured to display at least one of the following:
    the input variable;
    an amount of the input variable;
    the input variable as transformed;
    an amount of the input variable as transformed;
    a graphical user interface and objects on a graphical object surface; and
    a mouse pointer.

3. The system according to claim 2, wherein the display unit is a screen.

4. The system according to claim 1, wherein:
    the sensor unit is further configured to record a current position and/or a current orientation of the robotic manipulator for transmitting the current position and/or the current orientation to the computing unit; and
    the computing unit is further configured to:
        actuate the actuators in such a manner that the robotic manipulator, during the manual guiding onto a predefined geometric structure, generates a resistance against movement of the robotic manipulator caused by the manual guiding; and
        activate a predefined function if the resistance exceeds a predetermined limit value or if a distance of a predefined point of the robotic manipulator with respect to the predefined geometric structure undershoots a predetermined limit value.

5. The system according to claim 4, wherein the predefined function is activation of an object on a graphical user interface, at least when a coordinate of the graphical user interface coincides with a predetermined coordinate range of the object.

6. The system according to claim 4, wherein the predefined geometric structure is a plane and the plane is invariant in terms of its orientation and position with respect to a terrestrial coordinate system.

7. The system according to claim 4, wherein the haptic feedback and/or the tactile feedback in each case further includes at least one feedback associated with the following:
    coincidence of the input variable and/or the current position and/or the current orientation of the robotic manipulator with an object on a graphical user interface; and
    coincidence of a coordinate of the graphical user interface with a predefined coordinate range of the object of the graphical user interface.

8. The system according to claim 7, wherein in the case of the feedback the coordinate of the graphical user interface is assigned, using the computing unit, to the input variable and/or the current position and/or the current orientation of the robotic manipulator.

9. The system according to claim 1, wherein the computing unit is configured to actuate the robotic manipulator with gravity compensation.

10. A method of performing an input on a robotic manipulator having a plurality of links including an end effector connected to one another by articulations and having actuators, the method comprising:
    recording, using a sensor unit, an input variable applied by a user by user's manual guiding of the robotic manipulator, on the robotic manipulator, wherein the input variable is a kinematic variable or a force and/or a moment;
    transmitting the input variable using the sensor unit;
    transforming, using a computing unit, the input variable received from the sensor unit via a predefined input variable mapping, wherein the predefined input variable mapping defines a mathematical mapping of the input variable onto a setting of a virtual control element; and
    actuating, using the computing unit, the actuators in such a manner that, during the manual guiding of the robotic manipulator, the robotic manipulator outputs a haptic feedback and/or a tactile feedback associated with a resistance-caused boundary, such that the robotic manipulator behaves as a rigid body to an extent made possible by the actuators against an attempted movement of the robotic manipulator.

11. The method according to claim 10, wherein the method comprises displaying at least one of the following using a display unit:
    the input variable;
    an amount of the input variable;
    the input variable as transformed;
    an amount of the input variable as transformed;
    a graphical user interface and objects on a graphical object surface; and
    a mouse pointer.

12. The method according to claim 11, wherein the display unit is a screen.

13. The method according to claim 10, wherein the method further comprises:
    recording, using the sensor unit, a current position and/or a current orientation of the robotic manipulator for transmitting the current position and/or the current orientation to the computing unit; and
    actuating, using the computing unit, the actuators in such a manner that the robotic manipulator, during the manual guiding onto a predefined geometric structure, generates a resistance against movement of the robotic manipulator caused by the manual guiding; and
    activating, using the computing unit, a predefined function if the resistance exceeds a predetermined limit value or if a distance of a predefined point of the robotic manipulator with respect to the predefined geometric structure undershoots a predetermined limit value.

14. The method according to claim 13, wherein the predefined function is activation of an object on a graphical user interface, at least when a coordinate of the graphical user interface coincides with a predetermined coordinate range of the object.

15. The method according to claim 13, wherein the predefined geometric structure is a plane and the plane is invariant in terms of its orientation and position with respect to a terrestrial coordinate system.

16. The method according to claim 13, wherein the haptic feedback and/or the tactile feedback in each case further includes at least one feedback associated with the following:
   coincidence of the input variable and/or the current position and/or the current orientation of the robotic manipulator with an object on a graphical user interface; and
   coincidence of a coordinate of the graphical user interface with a predefined coordinate range of the object of the graphical user interface.

17. The method according to claim 16, wherein in the case of the feedback the method comprises assigning, using the computing device, the coordinate of the graphical user interface to the input variable and/or the current position and/or the current orientation of the robotic manipulator.

18. The method according to claim 10, wherein the method comprises actuating, using the computing unit, the robotic manipulator with gravity compensation.

* * * * *